Dec. 3, 1968      F. W. THOMAS      3,414,808

ELECTRONIC-ELECTROLYTIC APPARATUS FOR GLOVE TESTER

Filed Oct. 19, 1965      3 Sheets-Sheet 1

INVENTOR.
FRANCIS W. THOMAS
BY *Hamilton & Cook*
ATTORNEYS

INVENTOR.
FRANCIS W. THOMAS
BY Hamilton & Cook
ATTORNEYS

INVENTOR.
FRANCIS W. THOMAS

United States Patent Office 3,414,808
Patented Dec. 3, 1968

3,414,808
ELECTRONIC-ELECTROLYTIC APPARATUS FOR GLOVE TESTER
Francis W. Thomas, Massillon, Ohio, assignor to Midwestern Equipment Company, Inc., Massillon, Ohio, a corporation of Ohio
Filed Oct. 19, 1965, Ser. No. 497,817
7 Claims. (Cl. 324—54)

ABSTRACT OF THE DISCLOSURE

An apparatus for immersing and testing a glove in an electrolytic bath where the gloves are held by a magnetic clamping device, an elevator assembly immerses the gloves in the electrolytic bath, an electronic detection device is connected between the clamping device and the electrolytic bath to indicate defects in the gloves, and electrical cycle control circuitry actuates the elevator assembly and times the operation of the electronic detection device.

---

The present invention relates generally to apparatus for testing thin-walled articles of rubber, plastic resins, or the like. More particularly, the invention relates to apparatus for detecting defects or holes in such articles. Specifically, the invention relates to electronic-electrolytic test apparatus for discerning such defects in surgical gloves.

It is imperative that surgical gloves be tested frequently in order to prevent development of fissures therein which would permit migration of germs or bacteria from the surgeon's hands. Furthermore, the testing techniques must be performed with accuracy in order to insure detection of minute flaws or weak spots which might develop into defects during subsequent sterilization and actual use of the gloves.

Heretofore, surgical gloves have usually been tested manually by inflating a glove and further distending individual glove regions and fingers for visual inspection. This manual method makes inordinate demands upon the time of hospital operating room personnel who perform the tedious, painstaking task. Moreover, the technique is entirely too inaccurate and is inevitably susceptible to human error.

In efforts toward solution of these problems, certain prior art concepts have proposed utilization of high voltage dielectric strength tests such as are employed in testing utility linemen's gloves and the like. However, owing to the low dielectric strength factors of thin-walled surgical gloves, such methods and apparatus have proven unsuitable due to the tendency of electrical rupture of even the good gloves. Furthermore, the use of high voltage apparatus creates personnel safety problems.

Still other prior art concepts have entailed use of electrical probes or wet tests wherein holes in the test article promote completion of a battery circuit and actuation of an alarm device. However, such devices are entirely too insensitive for testing surgical gloves.

More recently, it has been proposed to employ an electrolytic bath or basin arrangement in conjunction with elaborate electrical resistance detection circuitry, the gloves being tested while on the surgeon's hands. Aside from the facts that such methods are time-consuming and such delicate and unstable resistance detection circuits require frequent adjustment, the concepts require that the surgeon's body form part of the circuit, thereby creating safety hazards of electrical shock. Furthermore, the apparatus employed in such methods must be conveniently located within the operating room, the ambient atmosphere of which is usually charged with ether or other volatile anesthetics. Hence, such concepts create danger of explosions from sparks or static electricity produced by the equipment.

While it is possible to minimize these hazards by using complex and expensive protective circuits and explosion-proof enclosures in the prior art electrolytic basin apparatus, it is virtually impossible to wholly eliminate the dangers. Furthermore, the inclusion of such protective circuits renders the resistance detection circuitry even more hypersensitive and unstable, necessitating greater frequency of adjustments of increased criticality.

Accordingly, it is a primary object of the present invention to provide a simple, inexpensive, and reliable testing apparatus for surgical gloves and the like.

It is a further object of the invention to furnish an automatic surgical glove tester, as aforesaid, requiring a minimum of manual effort, adjustment, and servicing.

It is a still further object of the invention to provide such an apparatus which eliminates the above-described safety hazards to personnel.

It is yet another object of the invention to provide surgical glove testing apparatus having an improved combination cycling control and electronic circuitry for automatically detecting glove defects and flaws with a high degree of accuracy.

These and other objects and advantages of the present invention, together with structural variations and substitutions of equivalent components, will be apparent to those skilled in the art from the following detailed description of one preferred embodiment of the invention as illustrated in the accompanying drawings, it being understood that such variations and equivalents are comprehended within the scope and spirit of the invention.

In the drawings, in which like reference characters are employed to designate like parts, assemblies, and circuit components, throughout:

In general, the invention is an electronic surgical glove testing apparatus for immersing and testing a glove in an electrolytic bath. The apparatus includes novel magnetic glove clamping means, and a unique electrical cycle control is provided to automate the system and furnish test time duration control and recording.

Figure 1:
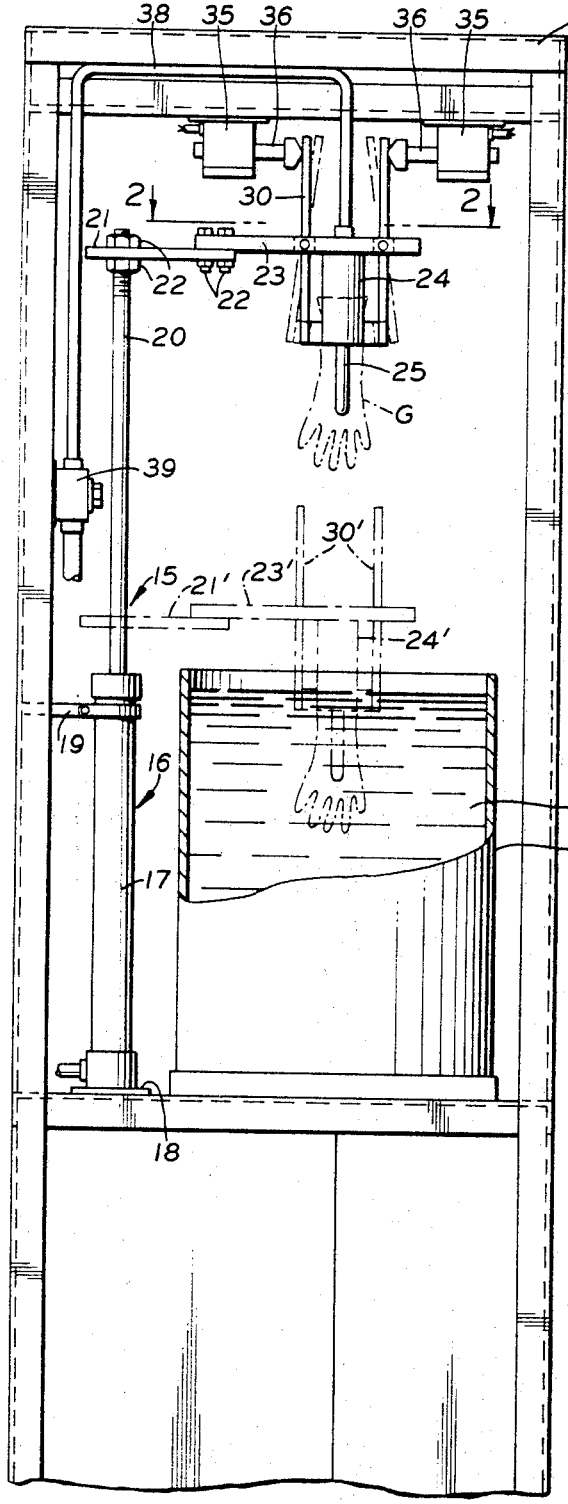
FIG. 1 is a side elevational view, partially in section, of the principal mechanical assembly of a surgical glove tester according to a preferred form of the present invention.

Referring to FIG. 1, the test apparatus 10 is preferably housed within an enclosure or cabinet 11 having a bath reservoir or tank 12 mounted therein and adapted to contain an electrolytic liquid 13, preferably tap water.

A glove elevator or immersing assembly, designated generally by the numeral 15 is mounted within the cabinet 11 alongside the tank 12. The elevator or immersing assembly 15 may utilize an electric motor and gear or pulley system, but preferably comprises a single-acting fluid motor 16 having a casing or cylinder 17 secured within the cabinet 11 as by stanchion 18 and bracket 19. Extending upwardly from, and adapted for vertical travel in, the cylinder 17 of the fluid motor 16 is a piston rod 20.

Figure 2:
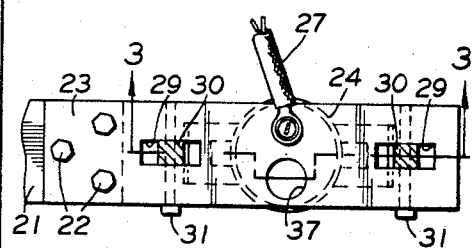
FIG. 2 is a sectional view taken on the lines 2—2 in FIG. 1.
Figure 3:
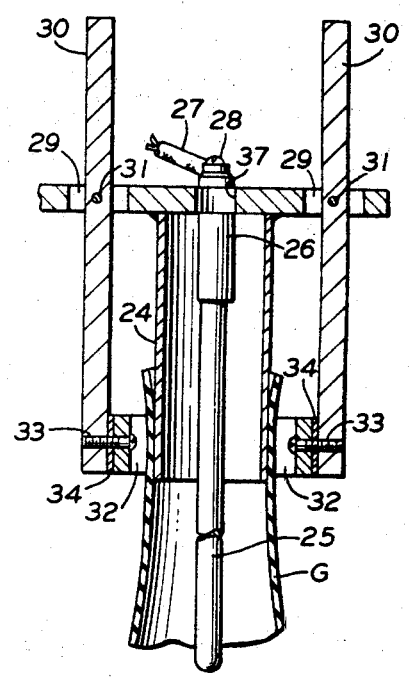
FIG. 3 is a sectional view taken along lines 3—3 in FIG. 2.

A yoke 21, preferably composed of an electrical insulator material, is attached to the upper end of the piston rod 20 as by double-nuts 22 and extends laterally therefrom over the tank 12. Attached to the yoke 21, is a mandrel plate 23. As best seen in FIGS. 2 and 3, the mandrel plate 23 has an open-ended ferromagnetic or steel cylindrical mandrel sleeve 24 welded onto the under side and extending downwardly toward the tank 12.

Located interiorly of the mandrel sleeve 24 there is a downwardly extending electrode 25 mechanically attached at its upper end to the mandrel plate 23, but electrically insulated therefrom as by an insulator sleeve 26. An electrical wire 27 is connected to the electrode 25 at the terminal 28 and connects the electrode 25 to electrical circuitry as hereinafter described.

Located alongside and diametrically of the mandrel sleeve 24 are a pair of slots 29 through the mandrel plate 23. Each slot 29 has a lever 30 extending vertically therethrough and journaled therein by pins 31 permitting lateral pivoting of the levers 30. At the lower end of each lever 30, a contoured-pole magnet 32 is attached as by screws 33 passing through magnetism insulating strips 34. The attraction force of the magnets 32 to the metal mandrel sleeve 24 retains the surgical glove G or like article thereon during immersion in the tank 12 and testing. While any suitable magnets 32 may be employed, a high-strength type, such as Alnico V or VI grade, is preferred.

As shown in the full-line or "up" position of the glove immersing assembly 15 in FIG. 1, electrical solenoids 35 are mounted on the upper wall of the cabinet 11. The solenoids 35 are spaced such that the travel of their armature plungers 36, under energization, pivots the levers 30 so that the magnets 32 are swung away from magnetic engagement with the mandrel sleeve 24, thereby releasing the glove G.

A bore 37 through mandrel plate 23, interiorly of mandrel sleeve 24, mates with a tap water supply pipe 38 when the glove immersing assembly 15 is in the "up" position shown in FIG. 1. A solenoid valve 39 controls the supply of tap water to the pipe 38 so that the glove G may be selectively filled with water through the bore 37.

Figures 4, 4A:
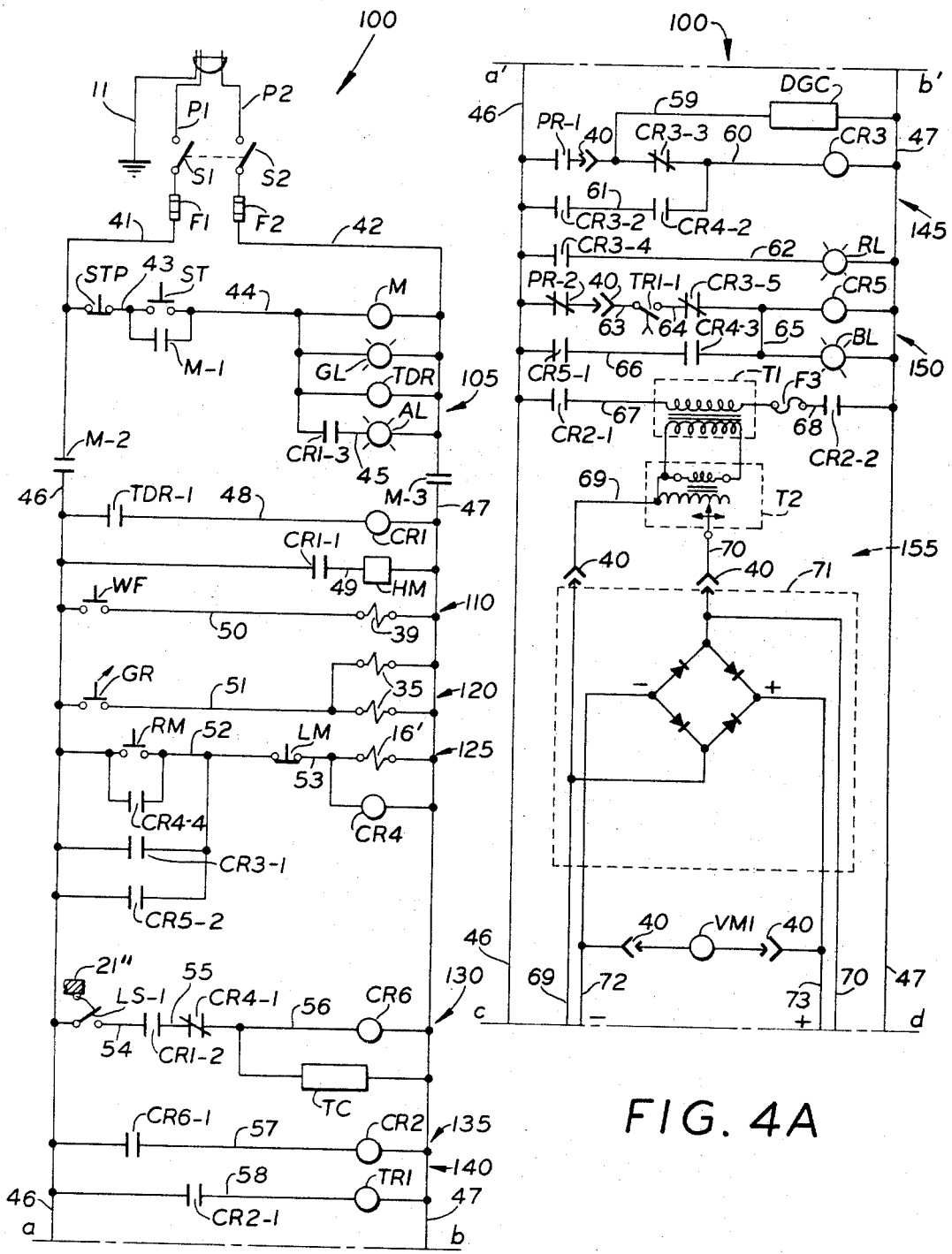
FIG. 4 is one part of a schematic electrical wiring diagram of the cycling control and electronic detection circuitry for the surgical glove tester.
FIG. 4A is another part or continuation of the wiring diagram of FIG. 4 joined at the chain lines a–b.
Figure 4B:
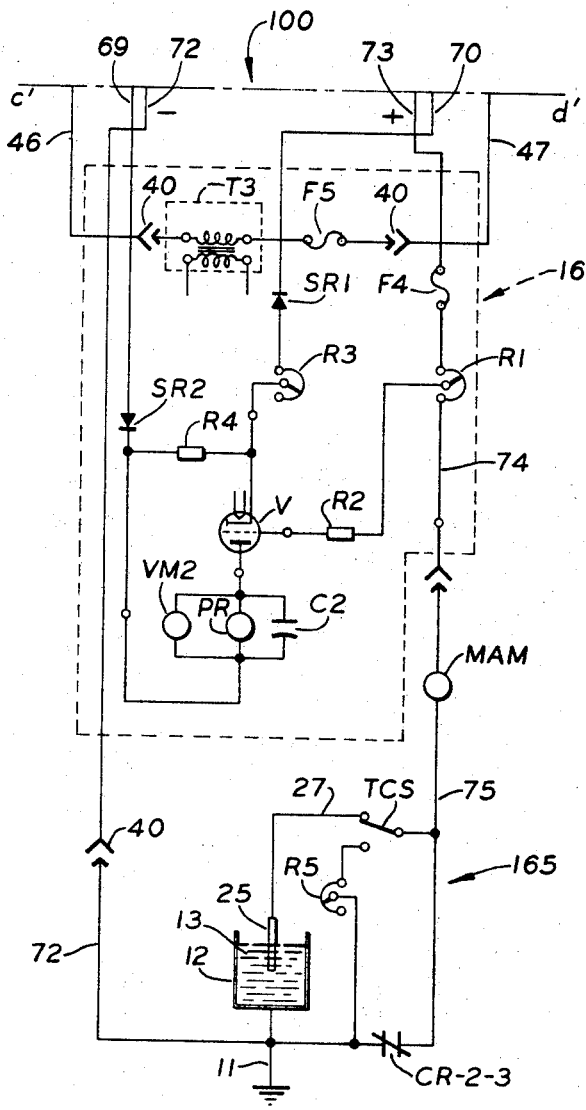
FIG. 4B is a further part or continuation of the wiring diagram of FIG. 4, the circuitry of FIG. 4B being joined to that of FIG. 4A at the chain lines c–d.

A preferred form of electrical cycle control and testing circuitry for the above-described apparatus is illustrated in the schematic wiring diagram of FIGS. 4, 4A, and 4B. The electrical components may be housed within the cabinet 11; and, as indicated generally in the schematic diagrams by the designations of plug-in jacks 40, modular components adapted for insertion in a suitable plug-in control chassis (not shown) are preferred to afford ease and simplicity in maintenance of the apparatus.

Referring generally to the schematic wiring diagram of FIGS. 4, 4A, and 4B, all relay contacts or switches therein are shown in their normally open or closed positions before energization or mechanical actuation. The combination cycling control and electronic detection circuitry, designated generally in the schematic wiring diagrams by the numeral 100, is shown in the preferred form as being semi-automatic. However, it will be understood that the apparatus and circuitry can be adapted to full automation, as for example in a glove factory assembly line, by slight modifications and use with suitable glove conveyor apparatus.

The combination circuitry 100 generally comprises, in parallel and sequentially interlocked connection, a starting and warmup section 105, a water fill section 110, a glove release section 120, a mandrel elevation section 125, a test timing section 130, a detection circuitry energization section 135, a good glove set-up section 140, a defective glove memory and indicator section 145, a good glove memory and indicator section 150, a D.C. power supply section 155, an electronic detection circuit section 160, and an electrode circuit section 165. The details of connection and components, as well as function and sequence of operation, for these various sections or sub-systems of the combination cycling control and electronic detection circuitry 100 will be apparent from the following detailed description, in which each relay or timer contact is prefixed by the designation of the coil which actuates it when energized.

However, it will be appreciated that, where relays and other logic elements are designated and described static control elements or other equivalent components may be employed. Similarly, where vacuum tube circuitry is illustrated, transistor or solid state elements can be utilized.

Referring to FIG. 4, single phase, 110-volt, 60-cycle, A.C. power is supplied to the combination circuitry 100 through receptacle-plug power lines P1 and P2, one side P1 of the power lines preferably being grounded to the cabinet 11. A double-pole fused disconnect switch (S1, S2) having a 250-volt rating with 30-amp. fuses (F1, F2) joins the incoming power lines (P1, P2) to the main A.C. circuit power lines 41 and 42.

A normally closed master stop-button STP is connected between power line 41 and wire 43 leading to one side of a normally open momentary-contact master start push-button ST. The other side of the start push-button ST is connected to a wire 44 leading to one side of a master starter relay coil M, the other side of the relay coil M being connected to A.C. power line 42. A normally open "seal-in" contact M–1 of the relay coil M is connected between wires 43 and 44 to provide a continuous current path to relay coil M until such time as the master stop-button STP is depressed. A green indicator light GL is connected from wire 44 to power line 42, across relay coil M, to signify the equipment is running. A time delay relay TDR is also connected in parallel across relay coil M to provide a delay in energization of the rest of the circuitry 100 so that the circuitry is provided with a warm-up period delay.

A normally open relay contact CR1–3 of a relay CR1, hereinafter described, is connected between wires 44 and 45. An amber indicator light AL is connected between wires 45 and 42 to indicate completion of the warm-up time delay period.

Normally open contacts M–2 and M–3 of master starter relay M connect A.C. power lines 41 and 42 to circuit power lines 46 and 47, respectively, to energize the cycling and detection circuitry 100 after starting.

A normally open contact TDR–1 of time delay relay TDR is connected between line 46 and wire 48, relay coil CR1 being connected in series therewith between wire 48 and line 47. Contact TDR–1 closes after a predetermined warm-up time following energization of time delay relay coil TDR, thereby energizing relay coil CR1.

A normally open contact CR–1 of relay CR1 is connected between line 46 and wire 49 and in series with an hour totalizing meter HM connected between wire 49 and line 47, the totalizing meter HM recording the total hours of testing time for the apparatus.

A momentary contact water fill push-button WF is connected between line 46 and wire 50 in series with the coil of the above-described solenoid water valve 39 which is connected between wire 50 and line 47. Actuation of push-button WF fills the glove prior to immersion and testing.

A glove release selector switch GR (shown in FIG. 4 in the open or "glove-clamped" position) is connected between line 46 and wire 51 and in series with paralleled coils of the above-described solenoids 35 which are connected between wire 51 and line 47. Closing selector switch GR energizes solenoids 35 actuating plungers 36 to swing the levers 30 away from the mandrel sleeve 24, thereby releasing the glove G.

A momentary contact "raise mandrel" push-button RM is connected between line 46 and wire 52 and is paralleled by sequential "seal-in" paths provided by contact CR4–4 of relay CR4, by contact CR3–1 of relay CR3, and by contact CR5–2 of relay CR5. A normally closed "lower mandrel" push-button LM is connected between wires 52 and 53 to effect de-energization of the mandrel elevation section 125 of the circuitry upon depression actuation thereof.

The coil of a solenoid air or fluid pressure valve 16' is connected between wire 53 and line 47 and upon energization supplies air or fluid pressure to the fluid motor 16 to raise the glove immersing assembly 15. A relay coil CR4 is also connected from wire 53 to line 47 across the solenoid valve 16' for interlocking and memory set-up purposes which will be understood from the circuitry hereinafter described.

A normally open limit switch LS–1 is connected between line 46 and wire 54 and is mechanically actuated or closed by the lowering movement of the glove immersing assembly 15, the actuation being accomplished, for example, by a dog or cam on the yoke 21, the cam 21" being designated schematically in FIG. 4. A normally open set-up contact CR1–2 of relay CR1 is connected in series with limit switch LS–1 between wires 54 and 55; and a normally closed interlock contact CR4–1 is also connected in series therewith between wires 55 and 56. Interlock contact CR4–1 prevents energization of the testing and cycling circuitry when the immersing assembly 15 is raised.

A test timing set-up relay coil CR6 is connected between wire 56 and line 47 and is paralleled by a pulse totalizing counter TC to record the total number of gloves or units tested.

A normally open contact CR6–1 of test timing set-up relay CR6 and a test set-up relay coil CR2 are connected in series between lines 46 and 47 by wire 57. The various contacts of test set-up relay CR2 hereinafter described energize the D.C. power supply section 155 and the electronic detection circuit section 160 of the circuit 100 to start the test.

A normally open contact CR2–1 of test set-up relay CR2 is connected across lines 46 and 47 in series with a test period timer relay coil TR1 by a wire 58. Timer relay TR1 may be set so as to maintain energization of the test and cycling circuitry for a preselected test duration.

Referring to FIGS. 4A and 4B, the defective glove memory and indicator section 145 of the circuitry is initiated by energization of the plate relay coil PR in the electronic detection section 160 when a defective glove is detected. Such energization closes normally open contact PR–1 of plate relay PR to connect line 46 to wire 59. A pulse is then supplied through normally closed contact CR3–3 through wires 59 and 60 to defective glove memory relay coil CR3. A seal-in feed path to coil CR3 is provided by normally open contacts CR3–2 and CR4–2, connected by wire 61, which contacts are connected in series to line 46 and wire 60 across contacts PR–1 and CR3–3.

A defective glove counter DGC is connected from the wire 59 to line 47 to record the total number of defective gloves detected. Similarly, a red indicator light RL is connected across lines 46 and 47 through normally open contact CR3–4 and wire 62 to indicate defective gloves.

When a defective glove is detected and relay CR3 is energized, normally open contact CR3–1, described above, closes, thereby energizing solenoid valve 16' and raising the glove immersing assembly 15. Later when another glove is lowered for testing into the tank 12 by depression of the lowering mandrel push-button LM, relay coil CR4 is de-energized, thereby opening contact CR4–2 and releasing defective glove memory coil CR3 or clearing its memory.

The good glove memory section 150 is interlocked with the defective glove memory section 145 by a normally closed contact CR3–5 which opens the feed to section 150 in situations wherein a defective glove is detected and relay coil CR3 is energized. Initial energization for good glove memory relay coil CR5 is provided from line 46 through normally closed contact PR–2 of plate relay PR, through wire 40, through normally open test timer contact TR1–1, through wire 61, and through aforementioned contact CR3–5 to wire 65. Normally open test timer contact TR1–1 closes to energize the good glove memory section 150 only after a preselected time delay period to ensure that defective gloves are not recorded as being good.

A blue indicator light BL is connected from wire 65 to line 47 across good glove memory relay coil CR5 to indicate good gloves. A seal-in path is provided from line 46 to wire 65 through normally open contact CR5–1, wire 66, and normally open contact CR4–3.

Normally open contact CR5–2, described above, closes when a good glove is detected to energize solenoid valve 16' and raise the glove immersing assembly 15. Thereafter, when push-button IM is depressed for a subsequent test, contact CR4–3 open to reset or clear the memory of good glove memory relay coil CR5.

The D.C. power supply section 155 and electronic detecting circuit 160 are energized by closing of normally open contacts CR2–1 and CR2–2 connected to lines 46 and 47 and actuated by relay coil CR2 described above. Contact CR2–1 is connected through wire 67 to one side of an isolating primary winding T1 of a cascade-connected autotransformer (T1, T2); while, contact CR2–2 is connected through wire 68 and a current limiting fuse F3 (preferably rated at 2 amps.) to the other side of the primary T1.

The autotransformer secondary T2 may have an adjustable tap to provide a selectively variable A.C. voltage between wires 69 and 70 of preferably 0–280 volts.

Wires 69 and 70 are connected to the input of a full-wave D.C. rectifier, designated generally by the broken lines and numeral 71. The D.C. rectifier 71 is preferably a full-wave silicon rectifier bridge.

A D.C. voltage output is this supplied at wires 72 and 73 with the polarities indicated. Also, a 0–300 volt D.C. voltmeter VM1 is preferably connected across lines 72 and 73 for calibration purposes.

Referring particularly to FIG. 4B, the electronic detection circuit section 160 will be understood from the following description.

The A.C. lines 46 and 47 are connected to a tertiary winding pair T3 of the autotransformer (T1, T2) to transform the A.C. line voltage to a low voltage for heating the cathode of a vacuum tube triode V. A suitable transformer stepdown ratio for winding T3 is from 110 volts to 6 volts, and a primary current limiting fuse F5 of 0.5 amp. rating is also included.

Wire 69 is connected through a rectifier, such as silicon diode SR2, to a fixed bias resistor R4 for the cathode of triode V, a suitable rating for resistor R4 being 33 kilohms and 1 watt. Wire 70 is connected through a rectifier, such as silicon diode SR1, to a variable potentiometer bias resistor R3 for the cathode of triode V, the potentiometer resistor R3 having maximum ratings of 5 kilohms and 2 watts.

Positive polarity D.C. lead 73 is connected through a current limiting fuse F4 to one side of the winding of a grid bias adjustment potentiometer resistor R1. The fuse F4 should be rated at 1 amp., and the resistor R1 should have maximum ratings of 100 kilohms and 2 watts. The center tap of the potentiometer resistor R1 is connected to the grid of triode V through a grid current limiting resistor R2, which should be rated at 10 megohms and 1 watt.

The plate of triode V is connected to one side of a plate relay coil PR having contacts as described above. The other side of the plate relay coil PR is connected to the silicon diode SR2 in wire 69 to complete the electron circuit through fixed bias resistor R4, to the cathode of triode V, through the plate of triode V, through the plate relay coil PR, and back to the silicon diode SR2.

A capacitor C2 is preferably connected across the plate relay coil PR to match the inductance impedance load thereof, effect filtering of the half-wave D.C. voltage applied thereto, and provide arc suppression. A 0–50 volt D.C. voltmeter VM2 is also preferably connected across plate relay coil PR for calibration and sensitivity adjustment purposes.

Thus connected, the circuit for vacuum triode V operates as a D.C. amplifier which should be initially biased to "cutoff" by adjustment or trim of grid potentiometer R1, the output winding side of which is connected to wire 74 leading to the electrode circuit section 165. When a predetermined excessive current flows through wire 74 in situations in which a defective glove is on test, the grid voltage of triode V becomes more positive, thereby triggering or firing the triode V and energizing the plate relay PR to initiate the defective glove memory section 145 of the circuit 100.

It will be clear that a suitable gating or switching circuit, employing one or more transistors, thyratrons, silicon-controlled-rectifiers, or the like, may be utilized in the foregoing circuitry instead of the vacuum tube triode V.

The electrode circuit section 165 of the circuit 100 is connected between negative polarity D.C. lead 72 and positive D.C. lead wire 74. Also, a microampere meter MAM, of 0–100 microamps, is preferably connected in series with lead 74 to lead 75.

Negative polarity D.C. lead 72 is connected to the grounded test tank 12; while, positive polarity D.C. lead wire 75 is normally connected to electrode lead 27 and electrode 25 through a single-pole double-throw test and calibration selector or toggle switch TCS.

When a defective glove is mounted over the electrode 25 and immersed in the tank 12, an electrolytic leakage current passes through lines 74, 75, and 27 to the tap water 13 and back to tank 12 and line 72, thus triggering triode V as explained above.

A calibration circuit comprising a potentiometer R5 of 10 megohms and 2 watts is preferably connected between the normally open pole of switch TCS and the grounded D.C. lead 72. A normally closed interlock contact CR2–3 of the above-described test set-up relay coil CR2 is interposed between grounded D.C. line 72 and positive D.C. line 75 so that the calibration circuit is inoperative during automatic glove testing.

It should therefore be apparent that the above-described preferred embodiment of surgical glove testing apparatus and circuitry accomplishes the several objects of the invention.

What is claimed is:

1. Glove testing apparatus comprising, glove mandrel means having a ferromagnetic sleeve attached thereto, electrolytic bath means, elevator means mounting said gloove mandrel means for selective immersion in said bath means, electrode means extending downwardly from said glove mandrel means and attached thereto but electrically insulated therefrom, said electrode means being adapted for insertion into the interior of a gloove being tested, lever clamping means including magnet means on said glove mandrel means for selective magnetic engagement with said ferromagnetic sleeve to retain a glove therebetween, electronic detection means electrically connecting said electrode means and said electrolytic bath means to detect glove defects, and electrical cycle control means electrically actuating said elevator means and electrically timing the operation of said electronic detection means for safe automated cycling of the testing apparatus.

2. Apparatus, according to claim 1, said apparatus further comprising, at least one solenoid having an armature plunger positioned for selective actuation to disengage said lever clamping means from said mandrel sleeve and release the glove.

3. Apparatus, according to claim 2, said apparatus comprising electrolytic liquid supply means cooperating with said glove mandrel means to selectively fill a glove being tested with electrolytic liquid prior to immersion in said electrolytic bath means.

4. Apparatus, according to claim 1, wherein said electronic detection means comprises, an amplifier normally biased to block conduction and connected to be triggered by a preselected level of current flow from said electrode means through said electrolytic bath means.

5. Apparatus, according to claim 3, wherein said electrical cycle control means comprises, circuit means providing electrical starting and warmup, an electrolytic liquid fill means connected to said starting and warmup section for filling a glove to be tested, a glove release means connected to said starting and warmup section and a glove from said glove mandrel means, a test timing means conected to said starting and warup section and correlating action of said elevator means and said electronic detection means, a detection circuit energization means connected to said starting and warmup section and said test timing section and providing a preselected test duration, a good glove set-up means connected to said detection circuit energization means and energizing said electronic detection means, a defective glove memory means connected to said test timing means and to said electronic detection means for actuation thereby upon detection of a defective glove and to initiate raising of said elevator means, and a good glove memory means connected to said good glove set-up means and to said electronic detection means, and interlocked therewith to indicate a flawless glove after a predetermined test period and to initiate raising of said elevator means.

6. Apparatus, according to claim 3, wherein said electrical cycle control means comprises, circuit means providing electrical starting and warmup, an electrolytic liquid fill means connected to said starting and warmup section for filling a glove to be tested, a glove release means connected to said liquid fill section and releasing a glove from said glove mandrel means, a test timing means connected to said starting and warmup section and correlating action of said elevator means and said electronic detection means, a detection circuit energization means connected to said starting and warmup section and said test timing section and providing a preselected test duration, a good glove set-up means connected to said detection circuit energization means and energizing said electronic detection means, a defective glove memory and indicator means connected to said test timing section, a good glove memory and indicator means connected to said good glove set-up means, a D.C. power supply means connected to said starting and warmup means, an electronic detection circuit means connected to said D.C. power supply means and to said defective glove memory and indicator means for actuation thereof upon triggering of said electronic detection circuit means thereby to initiate actuation of said mandrel elevation means, said electronic detection circuit means being interlocked in its untriggered state with said good glove memory and indicator means to permit indication of a good glove after a predetermined test period and initiation of actuation of said mandrel elevation section, and an electrode means connected to said electronic detection circuit section for triggering thereof upon detection of a defective glove.

7. Surgical glove testing apparatus comprising; electrolytic bath means (12), elevator means (15) positioned alongside and extending upwardly from said bath means and adapted for selective vertical reciprocation, yoke means (22) carried by said elevator means and extending laterally over said bath means, downwardly extending mandrel means (23, 24) carried by said yoke means and positioned thereon for immersion in said bath means upon reciprocation of said elevator means, electrode means (25) extending downwardly from said mandrel means and attached to but electrically insulated therefrom, magnetic lever means (30) carried by said mandrel means for selective magnetic engagement therewith to frictionally retain a glove (G) therebetween, solenoid means (35)

mounted for selective disengagement of said magnetic lever means from said mandrel means to release said glove, electrolytic liquid supply means (38) operatively communicating with said mandrel means for selectively filling a glove theron with electrolytic liquid prior to immersion thereof in said electrolytic bath means, electronic means (160) connected between said electrode means and said electrolytic bath means to detect glove flaws, and electrical cycle control means (100) to initiate reciprocation of said elevator means and time the operation of said electronic means.

References Cited

UNITED STATES PATENTS

| | | | |
|---|---|---|---|
| 2,942,248 | 6/1960 | Huggins | 324—54 XR |
| 2,978,636 | 4/1961 | Fountain | 324—54 |
| 3,281,675 | 10/1966 | Shillington | 324—54 |
| 2,054,204 | 9/1936 | McDonald | 73—45.5 |
| 2,213,113 | 8/1940 | Youngs | 324—54 X |
| 2,391,351 | 12/1945 | Schmidt | 73—45.5 |
| 2,609,094 | 9/1952 | Fry | 324—54 X |
| 2,697,935 | 12/1954 | Gordon | 73—45.5 |
| 3,093,793 | 6/1963 | Hicken | 324—54 |

OTHER REFERENCES

Macentyre: Glove Tester and Drier that Saves Time, Electrical World, vol. 89, No. 11, Mar. 12, 1927, p. 561.

RUDOLPH V. ROLINEC, *Primary Examiner.*

G. R. STRECKER, *Assistant Examiner.*

UNITED STATES PATENT OFFICE
CERTIFICATE OF CORRECTION

Patent No. 3,414,808                                        December 3, 196

Francis W. Thomas

It is certified that error appears in the above identified patent and that said Letters Patent are hereby corrected as shown below:

Column 4, line 6, after "described" insert a comma. Column line 54, cancel "the"; line 56, "Similarly," should read -- Similarly --; line 74, "clesed" should read -- closed --. Column line 15, "IM" should read -- LM --; line 16, "open" should read -- opens --; line 35, "this" should read -- thus --. Column 8, line 13, after "said" cancel "starting and warmup section and" and insert -- liquid fill section and releasing --; line 15, "warup" should read -- warmup --.

Signed and sealed this 15th day of September 1970.

(SEAL)
Attest:

EDWARD M.FLETCHER,JR.                      WILLIAM E. SCHUYLER, JR.
Attesting Officer                             Commissioner of Patents